United States Patent
Cho et al.

(12)
(10) Patent No.: US 6,323,305 B1
(45) Date of Patent: Nov. 27, 2001

(54) PROCESS FOR PREPARING POLYETHYLENE NAPHTHALATE BASED POLYMERS BY USING NDCA OR ITS DERIVATES

(75) Inventors: Hyun Nam Cho; Jae Min Hong, both of Seoul; Hyoung-Wook Lee, Kyungki-Do; Young Chan Ko, Seoul; Il Seok Choi, Kyungki-do, all of (KR)

(73) Assignee: Korea Institute of Science and Technology, Seoul (KR)

( * ) Notice: Subject to any disclaimer, the term of this patent is extended or adjusted under 35 U.S.C. 154(b) by 0 days.

(21) Appl. No.: 09/589,267

(22) Filed: Jun. 7, 2000

(30) Foreign Application Priority Data

Feb. 26, 2000 (KR) .................................................. 9635/00

(51) Int. Cl.$^7$ ............................... C08G 63/02; C08K 5/05
(52) U.S. Cl. .......................... 528/298; 528/495; 528/496; 528/499; 524/765; 524/767
(58) Field of Search ................................... 528/298, 495, 528/496, 499; 524/765, 767

(56) References Cited

U.S. PATENT DOCUMENTS

| | | | |
|---|---|---|---|
| 5,811,513 | * | 9/1998 | Iwasaki et al. ....................... 528/279 |
| 5,895,807 | * | 4/1999 | Galko et al. .......................... 525/444 |
| 6,040,417 | * | 3/2000 | Cho et al. ............................. 528/279 |
| 6,100,374 | * | 8/2000 | Iwasaki et al. ....................... 528/483 |
| 6,130,262 | * | 10/2000 | Suzuki et al. ........................... 521/48 |

FOREIGN PATENT DOCUMENTS

WO 90/14375 * 11/1990 (WO).
WO 97/17391 * 5/1997 (WO).

* cited by examiner

*Primary Examiner*—Samuel A. Acquah
(74) *Attorney, Agent, or Firm*—Darby & Darby

(57) ABSTRACT

The present invention provides a process for preparing polyethylene naphthalate polymers comprising: esterifying a slurry comprising NDCA or a dicarboxylic acid containing NDCA or derivatives thereof, and ethylene glycol or a glycol containing ethylene glycol or derivatives thereof to produce esterification compounds comprising bis (beta-hydroxyethyl) naphthalate or low molecular weight polymers thereof, wherein one or more primary alcohol is added to the slurry; and polycondensing the above resultant esterification compounds to produce polyethylene naphthalate polymers. The process of the present invention allows for the preparation of a slurry more easily and to maximize the manufacturing efficiency. Ultimately, it is possible to increase the productivity of the PEN polymers and to obtain high quality PEN since the method of the present invention has an effect of minimizing side products of the polymerization by reducing the amount of ethylene glycol considerably and of shortening the reaction time of the esterification reaction.

11 Claims, No Drawings

PROCESS FOR PREPARING POLYETHYLENE NAPHTHALATE BASED POLYMERS BY USING NDCA OR ITS DERIVATES

BACKGROUND OF THE INVENTION

1. Field of the Invention

The present invention relates to a process for preparing polyester such as polyethylene naphthalate (hereinafter as PEN) polymers. More particularly, the present invention relates to a novel and improved process for preparing PEN based polymers by adding a primary alcohol into the esterification process of naphthalene dicarboxylic acid (hereinafter as NDCA) and ethylene glycol (hereinafter as EG).

2. Description of the Background Art

PEN which is currently industrially manufactured has a number of superior properties to polyethylene terephthalate (hereinafter as PET). PEN has a higher degree of crystallization, a higher softening point, and other various superior properties in terms of mechanical strength, resistance to gas permeability, chemical resistance, thermal resistance, weather resistance, electric insulation, etc. Consequently, such PEN is widely used for manufacturing high quality films, bottles, high strength fibers and other industrial materials. PEN can be prepared by using naphthalene dicarboxylic acid (NDCA) or naphthalene dicarboxylic acid dimethylester (will be referred to as NDC hereafter) with ethylene glycol.

Commercially, PEN is prepared by a two step reaction consisting of 1) esterification between NDCA and glycol to obtain a low molecular weight esterified compound; and 2) polycondensation reaction of the esterified compound to obtain a higher molecular weight PEN product. Although the reaction scheme and apparatus required for producing PEN is similar to those for PET, detailed reaction conditions may vary according to the raw materials employed.

When NDC and EG are used as the raw materials to prepare PEN, the first step is to produce bis (beta-hydroxyethyl) naphthalate or its low molecular weight prepolymer (hereinafter as esterified compound) by the esterification of NDC and EG in the presence of zinc acetate [Zn(OAc)$_2$] or manganese acetate [Mn (OAc)$_2$] at a reaction temperature ranging from 180 to 260° C. to remove methanol. In this case, NDC and EG are admixed to form a slurry before being injected to an esterification reactor. The second step is to prepare a high molecular weight PEN polymer by the polycondensation reaction of the esterified compounds in the presence of polymerization catalysts such as antimony trioxide (Sb$_2$O$_3$) at a reaction temperature ranging from 280 to 300° C. at a reduced pressure (generally less than 1.0 torr).

Meanwhile, when NDCA and EG are used as the raw materials for manufacturing PEN, a slurry of NDCA and EG might be esterified to produce bis (beta-hydroxyethyl) naphthalate or its low molecular weight esterified polymers without using a catalyst such as zinc acetate [Zn (OAc)$_2$] or manganese acetate [Mn (OAc)$_2$] because NDCA itself acts as an acid catalyst promoting esterification reaction similar to that of TPA in producing PET. Appropriate reaction temperature range is from 180 to 260° C. In this case, water is formed as an esterification side product instead of methanol when NDC and EG are used as the raw materials. NDCA and EG should be admixed to form a slurry before being injected to an esterification reactor. However, forming a slurry requires an excess amount of EG to attain fluidity. After the esterification compounds are produced from NDCA and EG, they can be readily polycondensed in the presence of a polymerization catalyst such as antimony trioxide at a reaction temperature ranging from 280 to 300° C. at a reduced pressure (generally less than 1.0 torr) to produce a high molecular weight polymer in the same manner as when NDC and EG are used as the raw materials.

Generally, PEN has naphthalene rings in the molecular structure and a higher melt viscosity than PET, and requires a higher polymerization temperature. Therefore, PEN is more subject to discoloring by impurities and oxidation than PET. Besides, NDCA or NDC has a higher molecular weight, a lower solubility in EG than TPA or DMT used in the PET production process, the process conditions of PEN are different from those of PET. For instance, a slurry of the EG and TPA mixture having a molar ratio of EG/TPA ca. 1.1~1.2 can be easily fed to the esterification reactor continually. Meanwhile, to produce an EG/NDCA slurry equivalent to that of an EG/TPA slurry for PET process, a molar ratio of EG/NDCA must be greater than 3.0, since it is practically impossible to feed an EG/NDCA slurry having a lower molar ratio than 3.0 into the esterification reactor.

However, it is well known that an excess amount of EG in an EG/NDCA slurry decreases productivity and requires a higher separation cost to remove EG from the product. In addition, because an excess amount of EG lowers the reaction rates and lengthens the reaction time, formation of a side product, diethyleneglycol (hereinafter as DEG), which is detrimental to the quality of the final product is increased. Consequently, it is very important to minimize the use of EG in order to obtain a good quality PEN product.

Because the slurry formation tendency of the NDCA with EG depends not only on the molar ratio of NDCA/EG but also on the NDCA particle sizes, excess amount of EG required for a slurry may be reduced as NDCA particle size increases. However, since the reaction occurs on the NDCA particle surface or in the melt state, NDCA particles of smaller sizes are desirable for forming a uniform slurry and higher reaction rates. Therefore, it is difficult to minimize an excess amount of EG simply by controlling the NDCA particle sizes. Rather, it is required to develop alternative methods to make a slurry of NDCA and EG using the minimal amount of EG.

In order to overcome these problems, many methods have been proposed to add water into EG (U.S. Pat. No. 5,811,513 and WO 90-14375, WO 97-17391). However, these methods mentioned in the above references still employ too much excessive amount of EG and water with respect to NDCA or use a full-batch process instead of a continuous process. Therefore, these methods are not adequate for producing high quality PEN products from NDCA and EG.

SUMMARY OF THE INVENTION

It is therefore a general object of the invention to provide an improved method for manufacturing PEN using NDCA and EG with a low EG/NDCA molar ratio and with a shortened reaction time. It is a related object of the present invention to provide an improved method to produce a slurry of NDCA and EG which can be injected into an esterification reactor through a flow control valve and pipe. It is a related object of the present invention to provide a method to produce a slurry with a minimal EG/NDCA molar ratio by adding a mixing aid other than water. Other objects and advantages of the method of the present invention will become apparent upon reviewing the following detailed description and appended claims.

DETAILED DESCRIPTION OF THE INVENTION

The present invention provides a new and improved process for preparing polyethylene naphthalate polymers comprising: Esterifying a slurry comprising NDCA or a dicarboxylic acid containing NDCA or derivatives thereof, and ethylene glycol or a glycol containing ethylene glycol or derivatives thereof to produce esterification compounds comprising bis(beta-hydroxyethyl) naphthalate or low molecular weight polymer thereof, wherein one or more primary alcohol is added to the slurry; and Polycondensing the above resultant esterification compounds to produce polyethylene naphthalate polymers.

Almost all primary alcohols can be used in the present invention. In other words, any primary alcohol which does not slow the reaction rate or degrade the physical quality of the polymer can be used. But, it is preferable to use an alcohol that is less expensive and more effective in making a slurry with NDCA and EG. For example, a primary alcohol can be selected from aliphatic, cyclic or aromatic alcohols having 1 to 20 carbons. More particularly, alcohols can be selected from methanol, ethanol, n-propyl alcohol, isopropyl alcohol, n-butyl alcohol, isobutyl alcohol, secbutyl alcohol, tert-butyl alcohol, n-amyl alcohol, acetylisopropyl alcohol, pentyl alcohol, hexyl alcohol, heptyl alcohol, 2-ethylhexyl alcohol, octyl alcohol, decyl alcohol, dodecyl alcohol, tridecyl alcohol, octadecyl alcohol, stearyl alcohol, allyl alcohol, 2,2-diallyloxymethylbutyl alcohol, cyclopentyl alcohol, cyclohexyl alcohol, phenyl alcohol, benzyl alcohol and dodecylbenzyl alcohol. Among those alcohols, it is more preferable to use an alcohol selected from methanol, ethanol, propanol, isopropyl alcohol, butanol, isobutyl alcohol, pentanol, hexanol, 2-ethylhexyl alcohol, octanol and isooctanol.

Although the temperature of a slurry may vary according to the kind and the amount of alcohols added, it is preferable to maintain a slurry temperature at a range of 15~150° C. If the temperature of a slurry is either too much higher or too much lower than the above-preferred range, the primary alcohol may evaporate or freeze. Consequently, it would become impossible to feed a slurry into the reactor or the side reactions may be increased.

When a primary alcohol is added into a slurry of NDCA and EG, a slurry can be fed easily since the viscosity of a slurry decreases considerably even at a low EG/NDCA molar ratio. Therefore, the esterification reaction can occur at a higher reaction rate, thereby minimizing the production of by-products and the required reaction time.

It is not necessary to limit the amount of primary alcohol to be added in a slurry. It is preferable, however, that the amount of alcohol is 0.01~10 times by weight with respect to the amount of ethylene glycol, more preferably 0.1~1.0 times by weight with respect to the amount of ethylene glycol.

In addition, it is acceptable to use an additive or a catalyst with primary alcohol in the reaction if the additive or catalyst does not hamper the progress of the reaction. That is, the conventional esterification catalysts such as zinc acetate [Zn (OAc)$_2$] or manganese acetate [Mn (OAc)$_2$] and additives such as water can be added to the reaction together. Especially, when water is also added to the reaction, it is preferable that the amount of water is 0.01~10 times by weight with respect to the amount of the primary alcohol added, more preferably 0.1~1.0 times by weight. It is not necessary to limit the amount of catalyst, but it is preferable to use amounts to attain a sufficient reaction rate at the respective reaction conditions.

For the esterification reaction using dicarboxylic acid and glycol as the raw materials as in the case of the present invention, the reaction temperature of 200~280° C. is preferable. Also, the reaction can be carried out either at atmospheric or at high pressure. The esterification product from the esterification reaction can be polycondensed at a temperature ranging from 280 to 300° C. preferably having a final temperature range from 285 to 295° C. It is desirable to elevate the reaction temperature while increasing the degree of vacuum gradually during the polycondensation reaction. It is also desirable to obtain a lower than 1 torr of vacuum pressure as the final pressure during the polycondensation reaction.

In addition, it is possible to use other polycondensation reaction catalysts. For instance, germanium compounds such as germanium oxide, carboxylates compounds of zinc, manganese and lead such as zinc acetate, manganese acetate and lead acetate, compounds of an alkali metal such as sodium hydroxide and potassium hydroxide, and compounds of an alkali earth metal such as calcium acetate can be added.

Dicarboxylic acid or its derivatives that can be used in the present invention include 2,6-NDCA, TPA, 2,6-NDC, DMT and aromatic, aliphatic and cycloaliphatic dicarboxylic acid including phthalic acid, isophthalic acid, diphenylsulfondicarboxylic acid, diphenylmethanedicarboxylic acid, diphenyletherdicarboxylic acid, iphenoxyethanedicarboxylic acid, malonic acid, succinic acid, glutaric acid, adipic acid, azelic acid, sebacic add, cyclohexanedicarboxylic acid, decalinic dicarboxylic acid, and their esterified derivatives including methyl ester, ethyl ester and phenyl ester. Also, glycol and its derivative can be selected from aliphatic, cyclic and aromatic diols including, for example, ethylene glycol, 1,3-propanediol, 1,2-propanediol, 1,2-butanediol, 1,3-butanediol, 1,4-butanediol, 1,5-pentanediol, 1,6-hexanediol, 1,4-cyclohexanedimethanol, 2,6-decahydronaphthalenedimethanol, 1,4-cyclohexanediol, bisphenol A, bisphenol S, bishydroxyethoxy bisphenol A and tetrabromobisphenol A.

Also multifunctional cross-linking agents selected from trimellitic acid, trimesic acid, pyromellitic acid, trimethylolpropane, glycerin, and pentaerythritol and monofunctional terminating agent selected from monomethoxypolyethylene glycol, stearyl alcohol, palmitic acid, benzoic acid, and naphthoic acid can be added.

Moreover, a phosphorus compound, which is used conventionally in preparing polyesters such as PET and PEN, may be added as a thermal stabilizer. The phosphorous compounds that can be used as the thermal stabilizer are phosphoric acid, phosphorous acid, metaphosphoric acid, trimethylphosphate, triethylphosphate, triphenylphosphate, trioctylphosphate, dimethylphosphite, diethylphosphite, dicyclohexylphosphite, diphenylphosphite, dioctylphosphite, dimethylpyrophosphate, diethylpyrophosphate, diphenylpyrophosphate, dicyclohexylpyrophosphate and dioctylpyrophosphate. A hindered phenol such as IGANOX 1010, IGANOX 1076, and IGANOX 1098 (Ciba-Geigy Company, Germany) can be added as an antioxidant. If necessary, other additives can be used. Those additives are, for example, ultraviolet absorbents such as benzotriazole; anti-softening point dropping agents such as triethylamine; delustering agents such as titanium oxide; nucleating agents such as silica and alumina; and other compounds such as dyes, fluorescent whitening agents, antistatic agents, and flame retardants, and so on.

The present invention will be further illustrated by the following examples. It should be understood that these examples are intended to be illustrative purposes only and the present invention is not limited to the conditions, materials or devices recited therein. Esterification Ratio (ER) was obtained by measuring the acidity value (AV) and saponification number (SN) of the produced esterified compound after the esterification reaction. In the following examples, all parts are given by weight unless otherwise stated. Also, the intrinsic viscosity ($\eta$) of the polymers were evaluated at 30° C., by measuring the dilute polymer solution prepared by dissolving polymer in admixed co-solvent of 6 parts of phenol and 4 parts of tetrachloroethane.

EXAMPLE 1

A slurry comprising 102 parts of EG, 238 parts of 2,6-NDCA (molar ratio of EG/2,6-NDCA: 1.5) and 100 parts of methanol at an atmospheric pressure and room temperature were continually fed automatically into an esterification reactor containing 300 parts of previously prepared esterified compounds. Injection rate was automatically controlled to maintain a reaction medium temperature of 240° C., which was preset before the slurry injection. After all of the slurry were injected, the esterification was continued to the end point which was determined by monitoring change in distillation column temperature and in the reaction product, that is water formation rate. After esterifying for 4 hours and 40 minutes, esterified compound having an esterification ratio of 97% was obtained. Then, the produced esterified compound was transferred to a polycondensation reactor equipped with a stirrer for mixing and a torque meter to monitor viscosity increase. After 250 ppm of antimony trioxide and 100 ppm of trimethylphosphate based on esterified compound were added to the reactor, the temperature was raised and the pressure was reduced simultaneously to reach 295° C. and 0.3 torr, respectively. The polycondensation reaction was continued with the monitoring of the viscosity. After 1 hour and 50 minutes of the polycondensation reaction, the product was extruded from the lower nozzle of the reactor into cooling water. The measured intrinsic viscosity of the final product was 0.642.

COMPARATIVE EXAMPLE 1

An esterification reaction was attempted by using 102 parts of EG and 238 parts of 2,6-NDCA (molar ratio of EG/2,6-NDCA: 1.5) without adding methanol during the reaction. However, it was impossible to form a slurry, so it was impossible to feed the NDCA and EG mixture into the esterification reactor and to carry out the esterification reaction thereafter. Therefore, it was impossible to obtain a polymer at this experimental condition.

COMPARATIVE EXAMPLE 2

An esterification reaction was carried out by using 205 parts of EG and 238 parts of 2,6-NDCA (molar ratio of EG/2,6-NDCA: 3.0) without the addition of methanol in the same manner as Example 1. After 6 hours and 50 minutes of the esterification reaction, esterified compound having an esterification ratio of 96% was produced. The polycondensation reaction was carried out using this esterified compound under the same condition as in Example 1. It took 2 hours and 10 minutes to obtain a polymer having the same intrinsic viscosity as that of in Example 1.

COMPARATIVE EXAMPLE 3

An esterification reaction was carried out at identical conditions as in Example 1 except that 130 parts of water was used instead of methanol. After 5 hours and 50 minutes of the esterification reaction, esterified compound having an esterification ratio of 96% was obtained. The polycondensation reaction was carried out using this esterified compound under the same conditions as in Example 1. It took 2 hours and 5 minutes to obtain a polymer having the same intrinsic viscosity as that shown in Example 1.

EXAMPLE 2

An esterification reaction was carried out at identical conditions as in Example 1 except that 110 parts of ethanol was used instead of methanol. After 4 hours and 50 minutes of the esterification reaction, esterified compound having an esterification ratio of 96% was obtained. The polycondensation reaction was carried out using this esterified compound under the same conditions as in Example 1. It took 1 hour and 55 minutes to obtain a polymer having the same intrinsic viscosity as that shown in Example 1.

EXAMPLE 3

An esterification reaction was carried out at identical conditions as in Example 1 except that 90 parts of isopropyl alcohol was used instead of methanol. After 4 hours and 50 minutes of the esterification reaction, esterified compound having an esterification ratio of 97% was obtained. The polycondensation reaction was carried out using this esterified compound under the same conditions as in Example 1. It took 1 hour and 50 minutes to obtain a polymer having the same intrinsic viscosity as that shown in Example 1.

EXAMPLE 4

An esterification reaction was carried out at identical conditions as in Example 1 except that 120 parts of n-butanol was used instead of methanol. After 4 hours and 40 minutes of the esterification reaction, esterified compound having an esterification ratio of 96% was obtained. The polycondensation reaction was carried out using this esterified compound under the same conditions as in Example 1. It took 2 hour and 10 minutes to obtain a polymer having the same intrinsic viscosity as that shown in Example 1.

EXAMPLE 5

An esterification reaction was carried out at identical conditions as in Example 1 except that the esterification reaction was carried out by using 82 parts of EG and 238 parts of 2,6-NDCA (molar ratio of EG/2,6-NDCA 1.2). After 6 hours and 20 minutes of the esterification reaction, esterified compound having an esterification ratio of 95% was obtained. The polycondensation reaction was carried out using this esterified compound under the same conditions as in Example 1. It took 2 hour and 20 minutes to obtain a polymer having the same intrinsic viscosity as that shown in Example 1.

EXAMPLE 6

An esterification reaction was carried out at identical conditions as in Example 1 except that 173 parts of 2,6-NDCA and 50 parts of TPA was used instead of 238 parts of 2,6-NDCA. After 4 hours and 50 minutes of the esterification reaction, esterified compound having an esterification ratio of 96% was obtained. The polycondensation reaction was carried out using this esterified compound under the same conditions as in Example 1. ft took 1 hour and 40 minutes to obtain a polymer having the same intrinsic viscosity as that shown in Example 1.

EXAMPLE 7

An esterification reaction was carried out at identical conditions as in Example 1 except that the esterification reaction was carried out by using 80 parts of EG and 30 parts of 1,4-butanediol instead of 102 parts of EG. After 4 hours and 30 minutes of the esterification reaction, esterified compound having an esterification ratio of 96% was obtained. The polycondensation reaction was carried out using this esterified compound under the same conditions as in Example 1. It took 1 hour and 50 minutes to obtain a polymer having the same intrinsic viscosity as that shown in Example 1.

EXAMPLE 8

An esterification reaction was carried out at identical conditions as in Example 3 except that the temperature of the slurry was maintained at 40° C. After 4 hours and 40 minutes of the esterification reaction, esterified compound having an esterification ratio of 96% was obtained. The polycondensation reaction was carried out using this esterified compound under the same conditions as in Example 1. It took 1 hour and 40 minutes to obtain a polymer having the same intrinsic viscosity as that shown in Example 1.

EXAMPLE 9

An esterification reaction was carried out at identical conditions as in Example 1 except that 170 parts of methanol was used instead of 100 parts of methanol. After 4 hours and 50 minutes of the esterification reaction, esterified compound having an esterification ratio of 96% was obtained. The polycondensation reaction was carried out using this esterified compound under the same conditions as in Example 1. It took 1 hour and 55 minutes to obtain a polymer having the same intrinsic viscosity as that shown in Example 1.

EXAMPLE 10

An esterification reaction was carried out at identical conditions as in Example 1 except that 80 parts of methanol and 20 parts of water were used together instead of 100 parts of methanol. After 5 hours and 10 minutes of the esterification reaction, esterified compound having an esterification ratio of 97% was obtained. The polycondensation reaction was carried out using this esterified compound under the same conditions as in Example 1. It took 2 hours to obtain a polymer having the same intrinsic viscosity as that shown in Example 1.

EXAMPLE 11

An esterification reaction was carried out at identical conditions as in Example 1 except that 60 parts of methanol and 40 parts of isopropyl alcohol were used together instead of 100 parts of methanol. After 4 hours and 50 minutes of the esterification reaction, esterified compound having an esterification ratio of 97% was obtained. The polycondensation reaction was carried out using this esterified compound under the same conditions as in Example 1. It took 1 hour and 55 minutes to obtain a polymer having the same intrinsic viscosity as that shown in Example 1.

As can be seen from the above, the present invention, in comparison to the conventional processes, provide an improved process in producing a slurry of NDCA and EG by the addition of a primary alcohol. Moreover, the present invention not only minimizes the amount of excess EG required for movable slurry, but also maximizes the efficiency of the esterification process. Consequently, the esterification time can be shortened and the by-products mainly composed of DEG can be diminished. Therefore, the quality of the final polymer product can be improved because of the lower amount of DEG and a better thermal stability.

Moreover, primary alcohol is more effective than water in improving fluidity of the slurry, less amount of primary alcohol can show better performance than water. And because primary alcohol is usually miscible with water, so alcohol can be used alone or as a mixture with water as well. Therefore, the present invention is expected to have high industrial applicability because the process according to this invention could increase the productivity of the PEN polymers and provide high quality polymers.

Although the present embodiment of the present invention have been disclosed for illustrative purpose, those skilled in the art will appreciate that various modification, addition and substitutions are possible, without departing from the scope and spirit of the invention as recited inn the accompanying claims.

What is claimed is:

1. A process for preparing polyethylene naphthalate polymers comprising:

esterifying a slurry comprising NDCA or a dicarboxylic acid containing NDCA or derivatives thereof, and ethylene glycol or a glycol containing ethylene glycol or derivatves thereof to produce esterification compounds comprising bis(beta-hydroxyethyl) naphthalate or low molecular weight polymers thereof, wherein one or more primary alcohol is added to the slurry; and polycondensing the above resultant esterification compounds to produce polyethylene naphthalate polymers.

2. The process for preparing polyethylene naphthalate polymers according to claim 1, wherein said dicarboxylic acid or derivatives thereof is one or more selected from the group consisting of 2,6-NDCA TPA, 2,6-NDCA and DMT.

3. The process for preparing polyethylene naphthalate polymers according to claim 1, wherein said glycol or derivatives thereof is one or more selected from the group consisting of ethylene glycol, 1,3-propanediol and 1,4-butanediol.

4. The process for preparing polyethylene naphthalate polymers according to claim 1, wherein the temperature of the above slurry is from 15 to 150° C.

5. The process for preparing polyethylene naphthalate polymers according to claim 1, wherein said primary alcohol is one or more selected from the group consisting of methanol, ethanol, n-propanol, isopropyl alcohol and n-butanol.

6. The process for preparing polyethylene naphthalate polymers according to claim 5, wherein said primary alcohol is methanol.

7. The process for preparing polyethylene naphthalate polymers according to claim 1, wherein water is added with the primary alcohol.

8. The process for preparing polyethylene naphthalate polymers according to claim 5, wherein the amount of said primary alcohol is 0.01~10.0 times by weight with respect to the amount of said ethylene glycol.

9. The process for preparing polyethylene naphthalate polymers according to claim 8, wherein the amount of said primary alcohol is 0.1~1.0 times by weight with respect to the amount of said ethylene glycol.

10. The process for preparing polyethylene naphthalate polymers according to claim 7, wherein the amount of said water is 0.01~10.0 times by weight with respect to the amount of said primary alcohol.

11. The process for preparing polyethylene naphthalate polymers according to claim 10, wherein the amount of said water is 0.1~1.0 times by weight with respect to the amount of said primary alcohol.

* * * * *

UNITED STATES PATENT AND TRADEMARK OFFICE
CERTIFICATE OF CORRECTION

PATENT NO.    : 6,323,305 B1
DATED         : November 27, 2001
INVENTOR(S)   : Hyun Nam Cho Page 1 of 1

It is certified that error appears in the above-identified patent and that said Letters Patent is hereby corrected as shown below:

Title page,
The name and address of the second assignee was omitted. The assignee should be listed as:
-- Korea Institute Of Science and Technology, Seoul, Korea; and S-Oil Corporation, Seoul, Korea --.

Signed and Sealed this

Fourteenth Day of May, 2002

Attest:

Attesting Officer

JAMES E. ROGAN
Director of the United States Patent and Trademark Office